(12) United States Patent
Hong

(10) Patent No.: US 12,183,210 B2
(45) Date of Patent: Dec. 31, 2024

(54) FLIGHT REPORTING METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWAE CO., LTD., Beijing (CN)

( * ) Notice: Subject to any disclaimer, the term of this patent is extended or adjusted under 35 U.S.C. 154(b) by 642 days.

(21) Appl. No.: 17/298,661

(22) PCT Filed: Dec. 18, 2018

(86) PCT No.: PCT/CN2018/121823
§ 371 (c)(1),
(2) Date: May 31, 2021

(87) PCT Pub. No.: WO2020/124379
PCT Pub. Date: Jun. 25, 2020

(65) Prior Publication Data
US 2022/0058958 A1 Feb. 24, 2022

(51) Int. Cl.
G08G 5/00 (2006.01)
B64U 10/13 (2023.01)
B64U 101/30 (2023.01)

(52) U.S. Cl.
CPC ........... *G08G 5/0013* (2013.01); *G08G 5/003* (2013.01); *B64U 10/13* (2023.01); *B64U 2101/30* (2023.01)

(58) Field of Classification Search
CPC ........ G08G 5/0013; G08G 5/003; G08G 5/00; G05D 1/00; H04W 4/40–48
(Continued)

(56) References Cited

U.S. PATENT DOCUMENTS 8,135,338 B1    3/2012  Gelon et al.
2016/0140851 A1* 5/2016  Levy .................... G08G 5/0069
                                                    701/410
(Continued)

FOREIGN PATENT DOCUMENTS

CN    101009907 A    8/2007
CN    102265119 A    11/2011
(Continued)

OTHER PUBLICATIONS

European Patent Office Action in Application No. 18943935.9, mailed on Jun. 2, 2023.
(Continued)

*Primary Examiner* — Rami Khatib
*Assistant Examiner* — Paul Allen
(74) *Attorney, Agent, or Firm* — Syncoda LLC; Feng Ma

(57) ABSTRACT

A flight reporting method can be performed by a reporting party, the reporting party including an unmanned aerial vehicle and/or unmanned aerial vehicle controller, the method including: determining flight reporting information, the flight reporting information including a first flight task to be reported; sending the flight reporting information to an unmanned aircraft system traffic management UTM device through a cellular network so that the UTM device can review the first flight task to obtain a review result; receiving the review result returned by the UTM device through the cellular network, the review result including review pass or review fail; according to the review result, determining whether to perform the first flight task.

4 Claims, 13 Drawing Sheets

(58) Field of Classification Search
USPC ..................................................... 701/2–18
See application file for complete search history.

(56) References Cited

U.S. PATENT DOCUMENTS

| | | | | |
|---|---|---|---|---|
| 2016/0234774 | A1* | 8/2016 | Vejlgaard | H04W 52/28 |
| 2017/0164199 | A1 | 6/2017 | Kong et al. | |
| 2017/0208512 | A1* | 7/2017 | Aydin | H04W 36/0055 |
| 2017/0230236 | A1* | 8/2017 | Kim | H04N 5/04 |
| 2017/0263132 | A1 | 9/2017 | Butler et al. | |
| 2018/0020496 | A1* | 1/2018 | Vanderveen | H04W 36/0011 |
| 2018/0368132 | A1* | 12/2018 | Babaei | H04W 76/11 |
| 2019/0045348 | A1* | 2/2019 | Li | H04W 16/28 |
| 2019/0103031 | A1* | 4/2019 | Evans | G08G 5/0091 |
| 2019/0311636 | A1* | 10/2019 | Fanelli | G08G 5/0078 |
| 2020/0077415 | A1* | 3/2020 | Tang | H04W 72/21 |
| 2021/0021333 | A1* | 1/2021 | Kusashima | H04L 5/0032 |
| 2021/0212131 | A1* | 7/2021 | Futaki | H04W 8/24 |
| 2021/0227534 | A1* | 7/2021 | Määttanen | G08G 5/0069 |

FOREIGN PATENT DOCUMENTS

| | | |
|---|---|---|
| CN | 105869442 A | 8/2016 |
| CN | 105869443 A | 8/2016 |
| CN | 205665905 U | 10/2016 |
| CN | 205692408 U | 11/2016 |
| CN | 106297417 A | 1/2017 |
| CN | 107204129 A | 9/2017 |
| CN | 107871404 A | 4/2018 |
| CN | 107949013 A | 4/2018 |
| CN | 108183770 A | 6/2018 |
| CN | 108781363 A | 11/2018 |
| EP | 2903363 A1 | 8/2015 |
| WO | 2018178750 A1 | 10/2018 |
| WO | 2018203120 A1 | 11/2018 |

OTHER PUBLICATIONS

Artist Michael C: "Flight Services—U.S. Department of Transportation", Dec. 10, 2017, XP093049780, https://www.faa.gov/documentLibrary/media/Order/JO_7110.10Z_Flight_Services.pdf.
2nd Office Action in CN 201880003027.2 mailed on Jul. 22, 2021.
Extended European Search Report (EESR) in EP 18943935.9 mailed Nov. 18, 2021.
Xu Ning, Release Date: Jan. 1, 2018; "Air interface evolution of cellular mobile communication systems-LTE Lte-A LTE Pro and 5G".
International Search Report in Application No. PCT/CN2018/121823, mailed on Sep. 27, 2019.

* cited by examiner

FLIGHT REPORTING METHOD AND APPARATUS

CROSS-REFERENCE TO RELATED APPLICATIONS

This application is a national stage of International Application No. PCT/CN2018/121823 filed on Dec. 18, 2018, the disclosure of which is hereby incorporated by reference in its entirety.

TECHNICAL FIELD

The present disclosure relates to the technical field of communication technology, and in particular, to a flight declaration method and device.

BACKGROUND

An unmanned aerial vehicle (UAV) is a flight vehicle without a crew operated by a radio remote control device and a self-provided program control device.

With the development of UAV technology, the UAV has been widely used. Respective countries have provided control measures for the UAV in view of characteristics of the UAV. For example, the UAV needs to declare a flight mission to a regulatory department before taking off, and a flying height of the UAV cannot exceed a limited altitude. In the related art, an unmanned aerial system (UAS) includes a UAV and a UAV controller, and unmanned aerial vehicle traffic management (UTM) is a background system or platform for managing the UAS. However, in the related art, there is no optimized solution for flight declaration through a cellular network.

SUMMARY

The present disclosure provides a flight declaration method and device so as to overcome the problem existing in the related art.

A first aspect of embodiments of the present disclosure provides a flight declaration method. The method is applied to a declaration party including an unmanned aerial vehicle and/or an unmanned aerial vehicle controller, and the method includes:

determining flight declaration information, the flight declaration information including a first flight mission that needs to be declared;

sending the flight declaration information to an unmanned aerial vehicle traffic management (UTM) device through a cellular network, so that the UTM device reviews the first flight mission to obtain a review result;

receiving the review result returned by the UTM device through the cellular network, the review result including review passing or review failing; and determining whether to perform the first flight mission according to the review result.

Optionally, the cellular network includes a base station and a core network device, and sending the flight declaration information to the UTM device through the cellular network includes:

sending the flight declaration information to the base station, so that the base station forwards the flight declaration information to the core network device, and then the core network device forwards the flight declaration information to the UTM device.

Optionally, sending the flight declaration information to the base station includes:

determining first signaling for carrying the flight declaration information;

adding the flight declaration information to the first signaling; and sending the first signaling to the base station, so that the base station obtains the flight declaration information from the first signaling.

Optionally, determining the first signaling for carrying the flight declaration information includes:

if the declaration party is performing network attachment, determining attachment request signaling as the first signaling; and if the declaration party has completed the network attachment, determining first radio resource control (RRC) signaling as the first signaling, the first RRC signaling including UE assistance information signaling.

Optionally, the cellular network includes a base station and a core network device, and receiving the review result returned by the UTM device through the cellular network includes:

receiving second signaling for carrying the review result sent by the base station, the review result being sent by the UTM device to the core network device, and then forwarded by the core network device to the base station; and obtaining the review result from the second signaling.

Optionally, the second signaling includes at least one of:
second RRC signaling;
media access control address control element (MAC CE); and
physical layer signaling.

Optionally, determining whether to perform the first flight mission according to the review result includes:

if the review result is the review passing, determining to perform the first flight mission; and if the review result is the review failing, determining not to perform the first flight mission.

Optionally, the method further includes:

when the review result returned by the UTM device is not received within a specified time duration, re-sending the flight declaration information to the base station, and abandoning declaration when a number of re-declarations exceeds a predetermined threshold.

A second aspect of embodiments of the present disclosure provides a flight declaration method. The method is applied to a cellular network that provides service to a declaration party including an unmanned aerial vehicle and/or an unmanned aerial vehicle controller, and the method includes:

receiving flight declaration information sent by the declaration party, and forwarding the flight declaration information to an unmanned aerial vehicle traffic management (UTM) device, the flight declaration information including a first flight mission that needs to be declared, so that the UTM device reviews the first flight mission to obtain a review result; and receiving the review result returned by the UTM device, and forwarding the review result to the declaration party, the review result including review passing or review failing, so that the declaration party determines whether to perform the first flight mission according to the review result.

Optionally, wherein the cellular network includes a base station and a core network device, and receiving the flight declaration information sent by the declaration party and sending the flight declaration information to the UTM device includes:

receiving, by the base station, first signaling for carrying the flight declaration information sent by the declaration party;

obtaining, by the base station, the flight declaration information from the first signaling; and sending, by the base station, the flight declaration information to the core network device through a first interface, and forwarding, by the core network device, the flight declaration information to the UTM device, the first interface being configured to characterize an interface between the base station and the core network device.

Optionally, the first signaling includes attachment request signaling or first RRC signaling, and the first RRC signaling includes UE assistance information signaling.

Optionally, the cellular network includes a base station and a core network device, and receiving the review result returned by the UTM device and sending the review result to the declaration party includes:

receiving, by the base station, the review result sent by the core network device through a second interface, the review result being sent by the UTM device to the core network device, and the second interface being configured to characterize an interface between the base station and the core network device;

determining, by the base station, second signaling for carrying the review result;

adding, by the base station, the review result to the second signaling; and sending, by the base station, the second signaling to the declaration party, so that the declaration party obtains the review result from the second signaling.

Optionally, the second signaling includes at least one of:
second RRC signaling;
media access control address control element (MAC CE); and
physical layer signaling.

A third aspect of embodiments of the present disclosure provides a flight declaration method. The method is applied to an unmanned aerial vehicle traffic management (UTM) device, and the method includes:

receiving flight declaration information sent by a declaration party through a cellular network, the declaration party including an unmanned aerial vehicle and/or an unmanned aerial vehicle controller, and the flight declaration information including a first flight mission that needs to be declared;

reviewing the first flight mission to obtain a review result, the review result including review passing or review failing; and sending the review result to the declaration party through the cellular network, so that the declaration party determines whether to perform the first flight mission according to the review result.

Optionally, the cellular network includes a base station and a core network device, and sending the review result to the declaration party through the cellular network includes:

sending the review result to the core network device, so that the core network device forwards the review result to the base station, and then the base station forwards the review result to the declaration party.

A fourth aspect of embodiments of the present disclosure provides a flight declaration device. The device is applied to a declaration party including an unmanned aerial vehicle and/or an unmanned aerial vehicle controller, and the device includes:

a first determining module, configured to determine flight declaration information, the flight declaration information including a first flight mission that needs to be declared;

a first sending module, configured to send the flight declaration information to an unmanned aerial vehicle traffic management (UTM) device through a cellular network, so that the UTM device reviews the first flight mission to obtain a review result;

a receiving module, configured to receive the review result returned by the UTM device through the cellular network, the review result including review passing or review failing; and a second determining module, configured to determine whether to perform the first flight mission according to the review result.

Optionally, the cellular network includes a base station and a core network device, and the first sending module includes:

a first sending sub-module, configured to send the flight declaration information to the base station, so that the base station forwards the flight declaration information to the core network device, and then the core network device forwards the flight declaration information to the UTM device.

Optionally, the sending sub-module includes:

a first determining sub-unit, configured to determine first signaling for carrying the flight declaration information;

an adding sub-unit, configured to add the flight declaration information to the first signaling; and a second sending sub-unit, configured to send the first signaling to the base station, so that the base station obtains the flight declaration information from the first signaling.

Optionally, the first determining sub-unit includes:

a second determining sub-module, configured to, if the declaration party is performing network attachment, determine attachment request signaling as the first signaling; and a third determining sub-module, configured to, if the declaration party has completed the network attachment, determine first radio resource control (RRC) signaling as the first signaling, the first RRC signaling including UE assistance information signaling.

Optionally, the cellular network includes a base station and a core network device, and the receiving module includes:

a receiving sub-module, configured to receive second signaling for carrying the review result sent by the base station, the review result being sent by the UTM device to the core network device, and then forwarded by the core network device to the base station; and an obtaining sub-module, configured to obtain the review result from the second signaling.

Optionally, the second signaling includes at least one of:
second RRC signaling;
media access control address control element (MAC CE); and
physical layer signaling.

Optionally, the second determining module includes:

a fourth determining sub-module, configured to, if the review result is the review passing, determine to perform the first flight mission; and a fifth determining sub-module, configured to, if the review result is the review failing, determine not to perform the first flight mission.

Optionally, the device further includes:

a second sending module, configured to, when the review result returned by the UTM device is not received within a specified time duration, re-send the flight declaration information to the base station, and abandon declaration when a number of re-declarations exceeds a predetermined threshold.

A fifth aspect of embodiments of the present disclosure provides a flight declaration device. The device is applied to a cellular network that provides service to a declaration party including an unmanned aerial vehicle and/or an unmanned aerial vehicle controller, and the device includes:

a first transceiving module, configured to receive flight declaration information sent by the declaration party, and forward the flight declaration information to an unmanned aerial vehicle traffic management (UTM) device, the flight declaration information including a first flight mission that needs to be declared, so that the UTM device reviews the first flight mission to obtain a review result; and a second transceiving module, configured to receive the review result returned by the UTM device, and forward the review result to the declaration party, the review result including review passing or review failing, so that the declaration party determines whether to perform the first flight mission according to the review result.

Optionally, the cellular network includes a base station and a core network device, and the first transceiving module includes:

a signaling receiving sub-module, configured to receive, by the base station, first signaling for carrying the flight declaration information sent by the declaration party;

an information obtaining sub-module, configured to obtain, by the base station, the flight declaration information from the first signaling; and an information sending sub-module, configured to send, by the base station, the flight declaration information to the core network device through a first interface, and forwarding, by the core network device, the flight declaration information to the UTM device, the first interface being configured to characterize an interface between the base station and the core network device.

Optionally, the first signaling includes attachment request signaling or first RRC signaling, and the first RRC signaling includes UE assistance information signaling.

Optionally, the cellular network includes a base station and a core network device, and the second transceiving module includes:

a review result receiving sub-module, configured to receive, by the base station, the review result sent by the core network device through a second interface, the review result being sent by the UTM device to the core network device, and the second interface being configured to characterize an interface between the base station and the core network device;

a signaling determining sub-module, configured to determine, by the base station, second signaling for carrying the review result;

a review result adding sub-module, configured to add, by the base station, the review result to the second signaling; and a review result sending sub-module, configured to send, by the base station, the second signaling to the declaration party, so that the declaration party obtains the review result from the second signaling.

Optionally, the second signaling includes at least one of: second RRC signaling;
media access control address control element (MAC CE); and
physical layer signaling.

A sixth aspect of embodiments of the present disclosure provides a flight declaration device. The device is applied to an unmanned aerial vehicle traffic management (UTM) device, and the device includes:

a declaration information receiving module, configured to receive flight declaration information sent by a declaration party through a cellular network, the declaration party including an unmanned aerial vehicle and/or an unmanned aerial vehicle controller, and the flight declaration information including a first flight mission that needs to be declared;

a flight mission reviewing module, configured to review the first flight mission to obtain a review result, the review result including review passing or review failing; and a review result sending module, configured to send the review result to the declaration party through the cellular network, so that the declaration party determines whether to perform the first flight mission according to the review result.

Optionally, the cellular network includes a base station and a core network device, and the review result sending module includes:

a review result sending sub-module, configured to send the review result to the core network device, so that the core network device forwards the review result to the base station, and then the base station forwards the review result to the declaration party.

A seventh aspect of embodiments of the present disclosure provides a non-transitory computer-readable storage medium having a computer program stored thereon. The computer program is configured to execute the flight declaration method provided by the above first aspect.

An eighth aspect of embodiments of the present disclosure provides a non-transitory computer-readable storage medium having a computer program stored thereon. The computer program is configured to execute the flight declaration method provided by the above second aspect.

A ninth aspect of embodiments of the present disclosure provides a non-transitory computer-readable storage medium having a computer program stored thereon. The computer program is configured to execute the flight declaration method provided by the above third aspect.

A tenth aspect of embodiments of the present disclosure provides a flight declaration device. The device is applied to a declaration party including an unmanned aerial vehicle and/or an unmanned aerial vehicle controller, and the device includes:

a processor; and
a memory, storing instructions being executable by the processor,
wherein the processor is configured to:
determine flight declaration information, the flight declaration information including a first flight mission that needs to be declared;

send the flight declaration information to an unmanned aerial vehicle traffic management (UTM) device through a cellular network, so that the UTM device reviews the first flight mission to obtain a review result;

receive the review result returned by the UTM device through the cellular network, the review result including review passing or review failing; and determine whether to perform the first flight mission according to the review result.

An eleventh aspect of embodiments of the present disclosure provides a flight declaration device. The device is applied to a cellular network that provides service to a declaration party including an unmanned aerial vehicle and/or an unmanned aerial vehicle controller, and the device includes:

a processor; and a memory, storing instructions being executable by the processor, wherein the processor is configured to:

receive flight declaration information sent by the declaration party, and forward the flight declaration information to an unmanned aerial vehicle traffic management (UTM) device, the flight declaration information including a first flight mission that needs to be declared, so that the UTM device reviews the first flight mission to obtain a review result; and receive the review result returned by the UTM device, and forward the review result to the declaration party, the review result including review passing or review failing, so that the declaration party determines whether to perform the first flight mission according to the review result.

A twelfth aspect of embodiments of the present disclosure provides a flight declaration device. The device is applied to an unmanned aerial vehicle traffic management (UTM) device, and the device includes:

a processor; and a memory, storing instructions being executable by the processor, wherein the processor is configured to:

receive flight declaration information sent by a declaration party through a cellular network, the declaration party including an unmanned aerial vehicle and/or an unmanned aerial vehicle controller, and the flight declaration information including a first flight mission that needs to be declared;

review the first flight mission to obtain a review result, the review result including review passing or review failing; and send the review result to the declaration party through the cellular network, so that the declaration party determines whether to perform the first flight mission according to the review result.

The technical solution provided by the embodiments of the present disclosure may include the following beneficial effects.

In the present disclosure, the declaration party determines the flight declaration information; then sends the flight declaration information to the UTM device through the cellular network, so that the UTM device reviews the first flight mission to obtain the review result; receives the review result returned by the UTM device through the cellular network, the review result including review passing or review failing; and determines whether to perform the first flight mission according to the review result, thereby realizing the flight declaration through the cellular network, and also expanding the implementation manner of flight declaration.

In the present disclosure, the cellular network receives the flight declaration information sent by the declaration party, and forwards the flight declaration information to the UTM device, the flight declaration information including the first flight mission that needs to be declared, so that the UTM device reviews the first flight mission to obtain the review result; and receives the review result returned by the UTM device, and forwards the review result to the declaration party, the review result including review passing or review failing, so that the declaration party determines whether to perform the first flight mission according to the review result, thereby helping the declaration party to complete the flight declaration, and further expanding the implementation manner of flight declaration.

In the present disclosure, after receiving the flight declaration information sent by the declaration party through the cellular network, the UTM device may review the first flight mission to obtain the review result, the review result including review passing or review failing; and send the review result to the declaration party through the cellular network, so that the declaration party may determine whether to perform the first flight mission according to the review result, thereby realizing the flight declaration through the cellular network, and improving flight declaration efficiency.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure.

DETAILED DESCRIPTION

Here, exemplary embodiments will be described in detail, and examples thereof are shown in the accompanying drawings. When the following description is made with reference to the drawings, unless otherwise indicated, the same number in different drawings indicate the same or similar element. The implementation described in the following exemplary embodiments do not represent all implementations according to the present disclosure, and on the contrary, they are merely examples of devices and methods according to some aspects of the present disclosure as detailed in the appended claims.

Terms used in the present disclosure are only for the purpose of describing specific embodiments, and are not intended to limit the present disclosure. Singular forms of "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although terms such as first, second, third, and the like may be used in the present disclosure to describe various information, the information should not be limited by these terms. These terms are only used to distinguish the same type of information from each other. For example, without departing from the scope of the present disclosure, instruction information may also be referred to as second information, and similarly, the second information may also be referred to as the instruction information. Depending on the context, the word "if" as used herein may be interpreted as "when" or "while" or "in response to determining".

Figure 1:
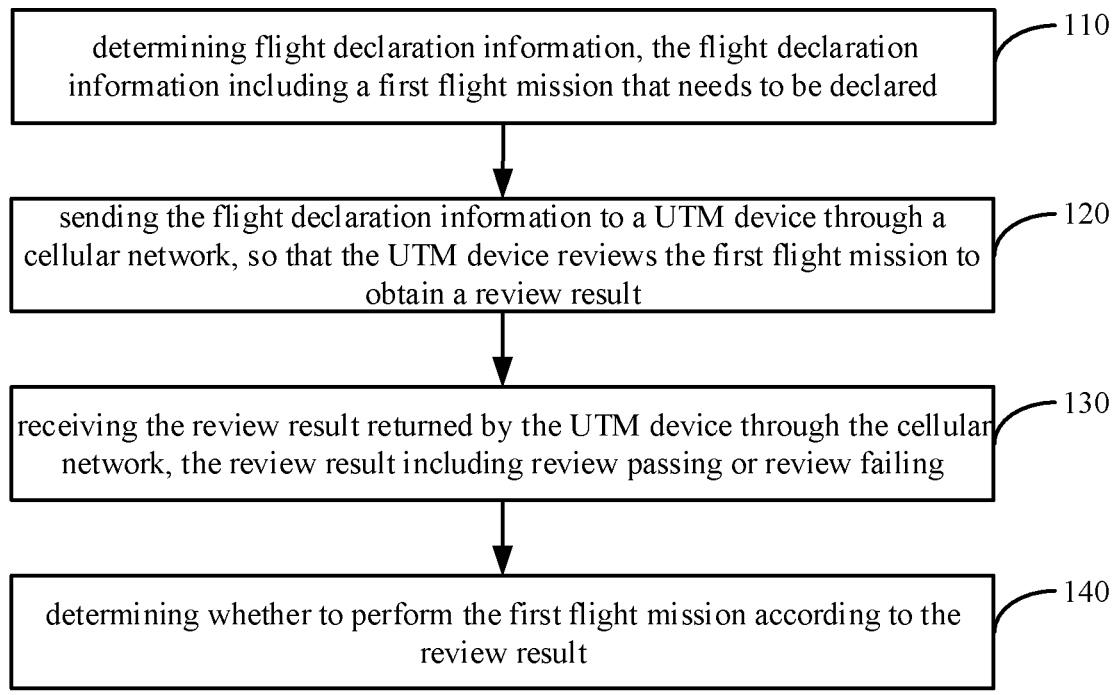
FIG. 1 is a flowchart of a flight declaration method according to an exemplary embodiment.
Figure 2:
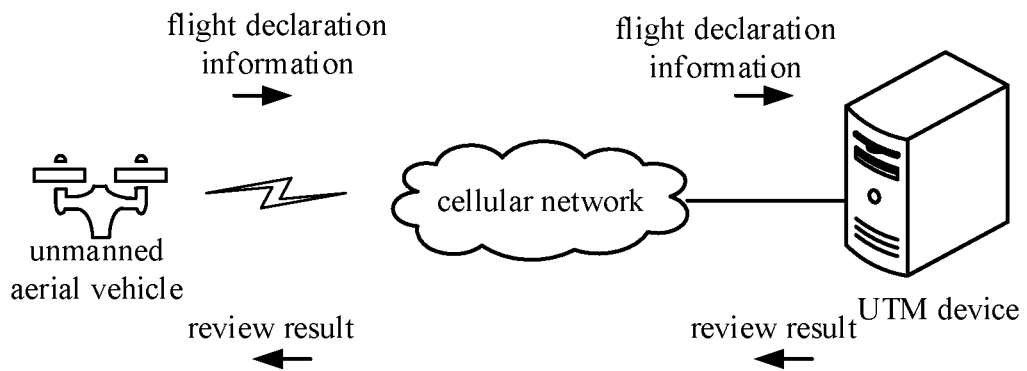
FIG. 2 is an application scenario diagram of a flight declaration method according to an exemplary embodiment.

FIG. 1 is a flowchart of a flight declaration method according to an exemplary embodiment, and FIG. 2 is an application scenario diagram of a flight declaration method according to an exemplary embodiment. The flight declaration method may be applied to a declaration party, and the declaration party may include an unmanned aerial vehicle and/or an unmanned aerial vehicle controller. As shown in FIG. 1, the flight declaration method may include the following steps 110-140.

In step 110, flight declaration information is determined, the flight declaration information including a first flight mission that needs to be declared.

In step 120, the flight declaration information is sent to a UTM device through an acellular network, so that the UTM device reviews the first flight mission to obtain the review result.

In an embodiment of the present disclosure, it may be that (1-1) the unmanned aerial vehicle sends the flight declaration information to the UTM device through the cellular network; (1-2) the unmanned aerial vehicle controller sends the flight declaration information to the UTM device through the cellular network; or (1-3) both the unmanned aerial vehicle and the unmanned aerial vehicle controller send the flight declaration information to the UTM device through the cellular network. When the declaration party includes both the unmanned aerial vehicle and the unmanned aerial vehicle controller, the unmanned aerial vehicle and the unmanned aerial vehicle controller may determine the flight declaration information simultaneously, or one of the unmanned aerial vehicle and the unmanned aerial vehicle controller may determine the declaration information, which is not specifically limited in the embodiment.

Figure 3:
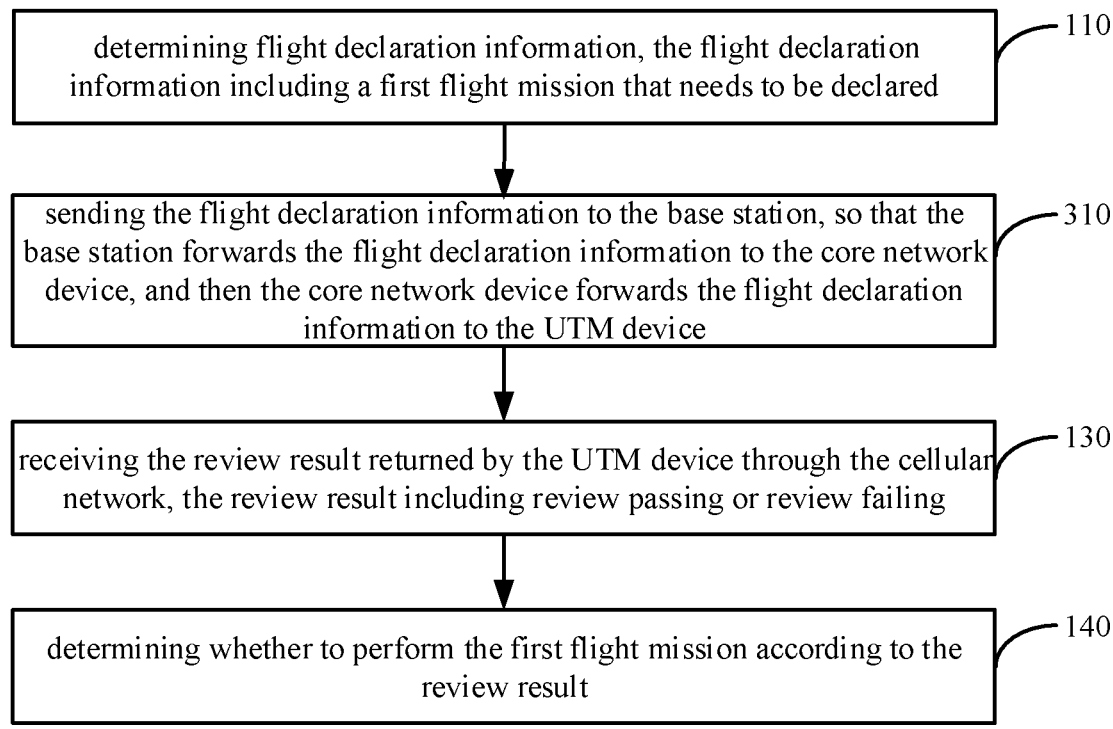
FIG. 3 is a flowchart of another flight declaration method according to an exemplary embodiment.
Figure 4:
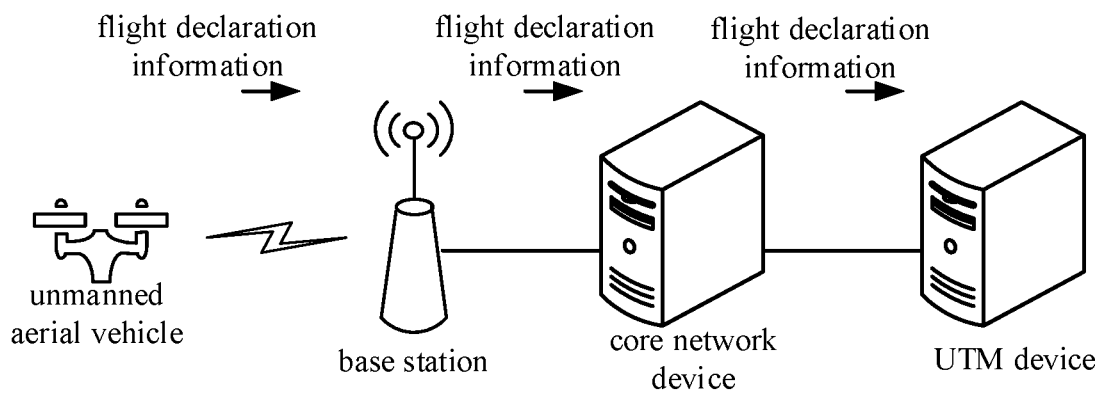
FIG. 4 is another application scenario diagram of a flight declaration method according to an exemplary embodiment.

The cellular network may include a base station and a core network device, a specific sending mode thereof may refer to the embodiment shown in FIGS. 3 and 4.

In step 130, the review result returned by the UTM device is received through the cellular network, the review result including review passing or review failing.

Figure 5:
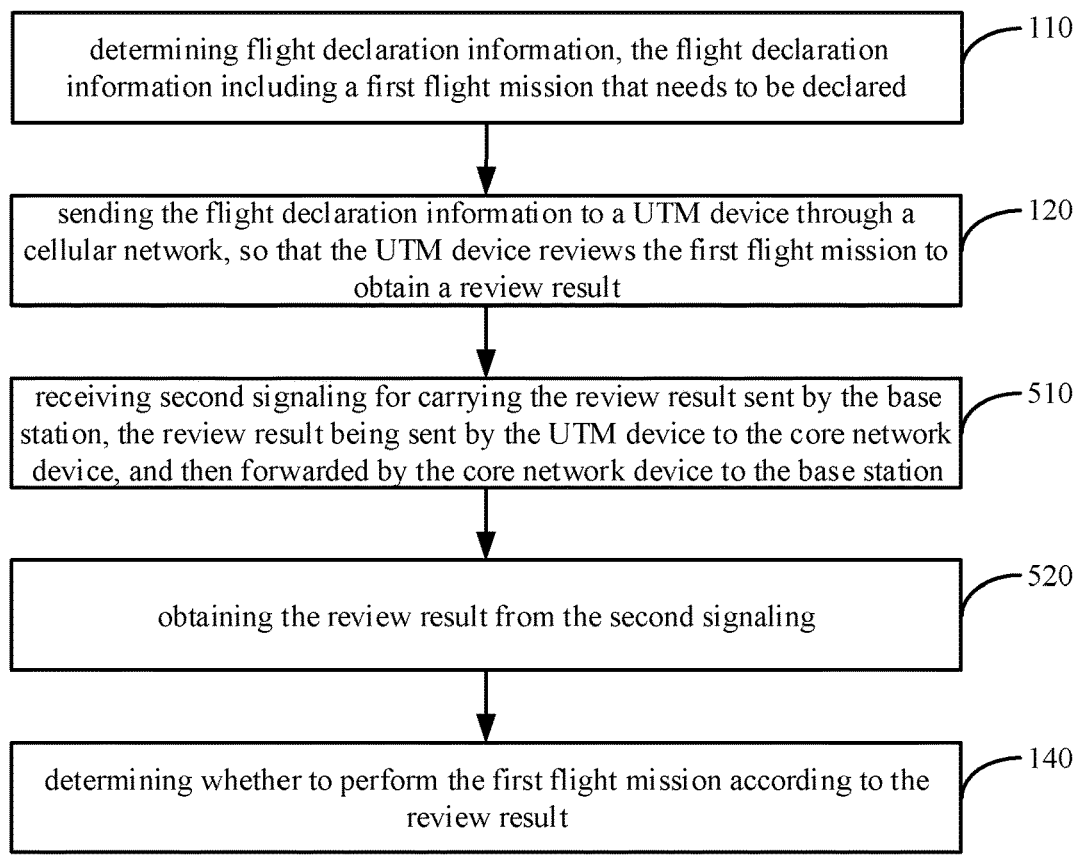
FIG. 5 is a flow chart of a flight declaration method according to an exemplary embodiment.
Figure 6:
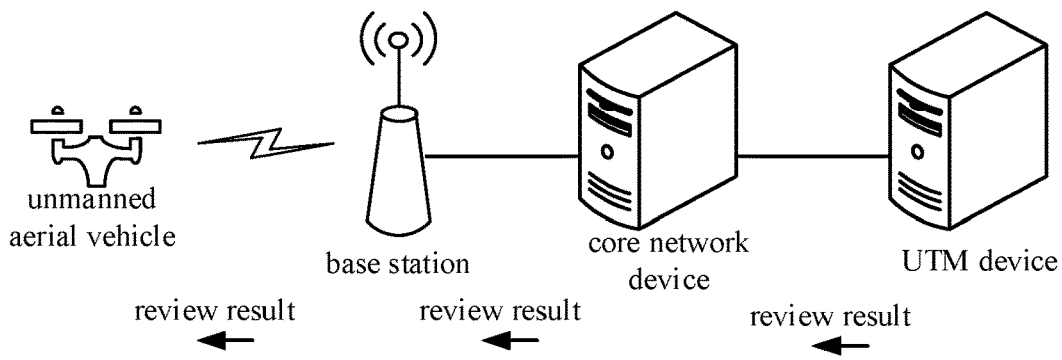
FIG. 6 is another application scenario diagram of a flight declaration method according to an exemplary embodiment.

In an embodiment of the present disclosure, the cellular network may include a base station and a core network device, and a specific receiving mode thereof may refer to the embodiment shown in FIGS. 5 and 6.

In step 140, it is determined, according to the review result, whether to perform the first flight mission.

In an embodiment of the present disclosure, the review result may be the review passing or review failing, therefore the declaration party may take corresponding operations according to the different review results.

In an embodiment, according to the different review results, the foregoing step 140 may include:

(2-1) if the review result is the review passing, determining to perform the first flight mission; and (2-2) if the review result is the review failing, determining not to perform the first flight mission.

As shown in FIG. 2, an exemplary application scenario includes an unmanned aerial vehicle as the declaration party, a cellular network and a UTM device. In FIG. 2, as an example, the unmanned aerial vehicle is taken as the declaration party. In addition, the declaration party may also be the unmanned aerial vehicle controller, or both the unmanned aerial vehicle and the unmanned aerial vehicle controller. After determining the flight declaration information, the unmanned aerial vehicle will send the flight declaration information to the UTM device through the cellular network. After receiving the flight declaration information, the UTM device will review the first flight mission included in the flight declaration information to obtain the review result, and return the review result to the unmanned aerial vehicle through the cellular network. After receiving the review result, the unmanned aerial vehicle will determine whether to perform the first flight mission based on the review result. For example, the review result is the review passing, and the unmanned aerial vehicle determines to perform the first flight mission. For another example, the review result is the review failing, and the unmanned aerial vehicle determines not to perform the first flight mission.

It can be seen from the above embodiment that it can realizes the flight declaration through the cellular network, and expand the implementation manner of flight declaration by determining the flight declaration information; sending the flight declaration information to the UTM device through the cellular network, so that the UTM device reviews the first flight mission to obtain the review result; receiving the review result returned by the UTM device through the cellular network, the review result including the review passing or review failing; and determining whether to perform the first flight mission according to the review result.

FIG. 3 is a flowchart of another flight declaration method according to an exemplary embodiment, and FIG. 4 is another application scenario diagram of a flight declaration method according to an exemplary embodiment. The flight declaration method may be applied to a declaration party, and the declaration party may include an unmanned aerial vehicle and/or an unmanned aerial vehicle controller. The method is based on the method shown in FIG. 1. The cellular network includes a base station and a core network device. As shown in FIG. 3, when the step 120 is performed, the following step 310 may be included.

In step 310, the flight declaration information is sent to the base station, so that the base station forwards the flight declaration information to the core network device, and then the core network device forwards the flight declaration information to the UTM device.

In an embodiment of the present disclosure, the declaration party sends the flight declaration information to the base station through first signaling of an air interface; and the base station forwards the flight declaration information to the core network device through interface signaling between the base station and the core network device.

In an embodiment, when the above step 310 is performed, the flight declaration information may be sent to the base station through the first signaling, which may specifically include:

(3-1) determining the first signaling for carrying the flight declaration information;
(3-2) adding the flight declaration information to the first signaling; and
(3-3) sending the first signaling to the base station, so that the base station obtains the flight declaration information from the first signaling.

The first signaling in the above (3-1) may be determined according to different scenarios. In an embodiment, the above (3-1) may include:

(4-1) if the declaration party is performing network attachment, determining attachment request signaling as the first signaling; and
(4-2) if the declaration party has completed the network attachment, determining first radio resource control (RRC) signaling as the first signaling, the first RRC signaling including UE assistance information signaling.

The above (4-1) indicates that the declaration party may send the flight mission that needs to be declared to the base station along with the process of performing the network attachment; and the above (4-2) indicates that if there is a new flight mission after the declaration party has completed the network attachment, the new flight mission may be declared through the first RRC signaling.

It can be seen from the above embodiment that when the cellular network includes the base station and the core network device, the flight declaration information may be sent to the base station first, and the base station forwards the flight declaration information to the core network device, and then the core network device transmits the flight declaration information to the UTM device. Especially, when the flight declaration information is sent to the base station, the flight declaration information may be sent through the first signaling that can carry the flight declaration information in different application scenarios, thereby improving the reliability of the flight declaration.

FIG. 5 is a flowchart of another flight declaration method according to an exemplary embodiment, and FIG. 6 is another application scenario diagram of a flight declaration method according to an exemplary embodiment. The flight declaration method may be applied to the declaration party, and the declaration party may include an unmanned aerial vehicle and/or an unmanned aerial vehicle controller. The method is based on the method shown in FIG. 1. The cellular network includes a base station and a core network device. As shown in FIG. 5, when the step 130 is performed, the following steps 510-520 may be included.

In step 510, second signaling for carrying the review result sent by the base station is received, the review result being sent by the UTM device to the core network device, and then forwarded by the core network device to the base station.

In an embodiment of the present disclosure, the core network device sends the review result to the base station through interface signaling between the base station and the core network device; and the base station sends the review result to the declaration party through the signal signaling of an air interface. The second signaling may include but is not limited to at least one of: (5-1) second RRC signaling; (5-2) media access control address control element (MAC Control Element, MAC CE); and (5-3) physical layer signaling, such as physical downlink control channel (PDCCH).

In step 520, the review result is obtained from the second signaling.

It can be seen from the above embodiment that when the cellular network includes the base station and the core network device, the review result may be obtained from the second signaling sent by the base station for carrying the review result, and especially, the second signaling may have multiple types of alternative implementation forms, thereby enriching the transmitting method of the review result, and improving the flexibility of flight declaration.

Figure 7:
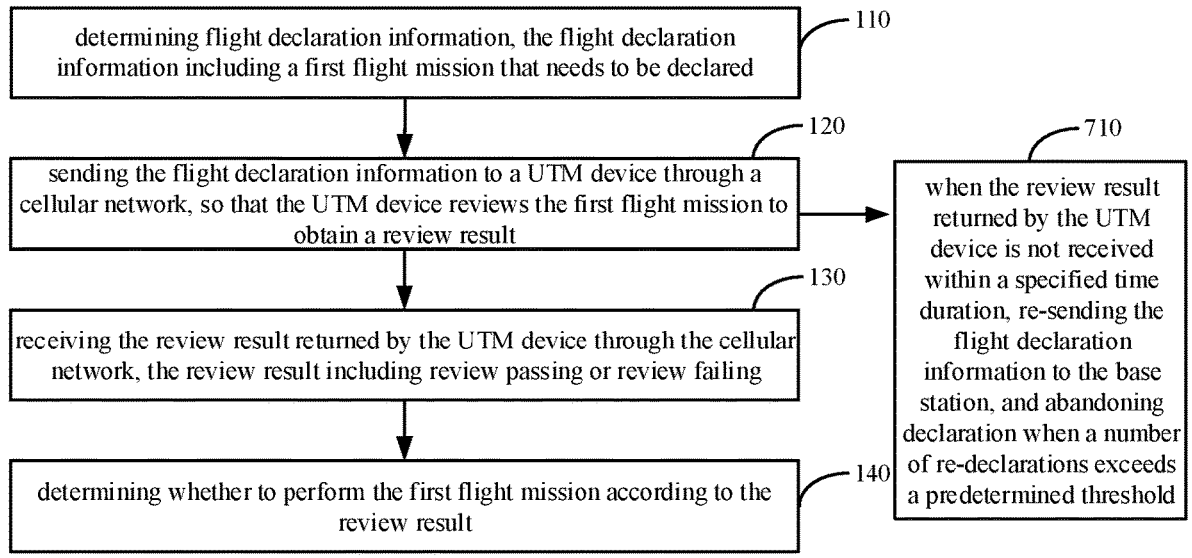
FIG. 7 is a flowchart of another flight declaration method according to an exemplary embodiment.

FIG. 7 is a flow chart of another flight declaration method according to an exemplary embodiment. The flight declaration method may be applied to the declaring party, and the declaring party may include an unmanned aerial vehicle and/or an unmanned aerial vehicle controller. The method is based on the method shown in FIG. 1. As shown in FIG. 7, the flight declaration method may further include the following steps 710.

In step 710, when the review result returned by the UTM device is not received within a specified time duration, the flight declaration information is re-sent to the base station, and declaration is abandoned when a number of re-declarations exceeds a predetermined threshold.

In an embodiment of the present disclosure, the specified time duration may be a predetermined time duration, such as 1 minute, and the declaration party may adjust the specified time duration according to an actual condition. In addition, in order to avoid a never-ending re-declaration, the predetermined threshold may be set in advance, for example, the threshold is set to be 5 times. That is, when the number of re-declarations exceeds 5 times, the declaration may be abandoned.

It can be seen from the above embodiment that when the review result returned by the UTM device is not received within the specified time duration, the flight declaration information may also be re-sent to the base station, and the declaration is abandoned when the number of re-declarations exceeds the predetermined threshold, thereby expanding the implementation of flight declaration, and avoiding the waste of resources.

Figure 8:
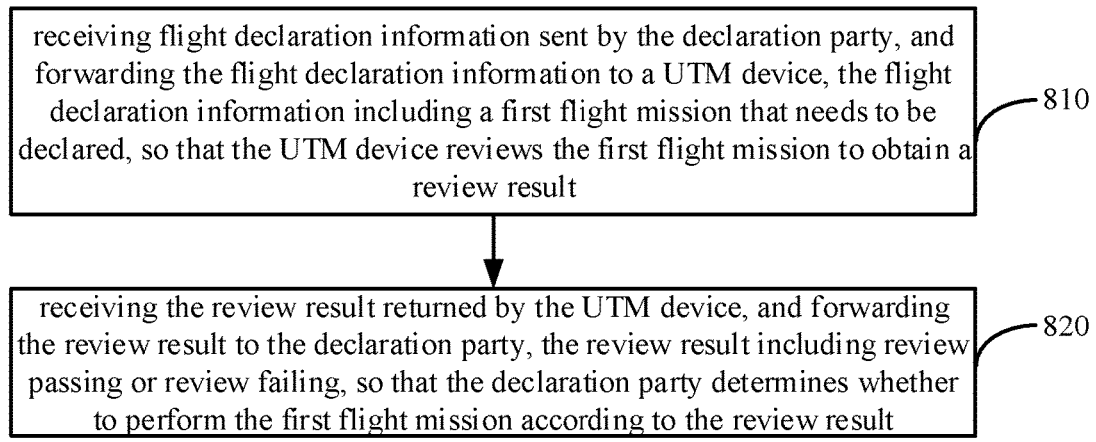
FIG. 8 is a flow chart of a flight declaration method according to an exemplary embodiment.

FIG. 8 is a flowchart of a flight declaration method according to an exemplary embodiment. The flight declaration method may be applied to a cellular network that provides service to a declaration party. The cellular network is the cellular network in the application scenario as shown in FIG. 2. As shown in FIG. 8, the flight declaration method may include the following steps 810-820.

In step 810, flight declaration information sent by the declaration party is received, and the flight declaration information is forwarded to a UTM device, the flight declaration information including a first flight mission that needs to be declared, so that the UTM device reviews the first flight mission to obtain a review result.

In an embodiment of the present disclosure, the cellular network may send the flight declaration information of the declaration party to the UTM device.

In an embodiment, the cellular network includes a base station and a core network device, such as the base station and the core network device in the application scenario shown in FIG. 4. When the step 810 is performed, the specific implementation process thereof may include:

(6-1) receiving, by the base station, first signaling for carrying the flight declaration information sent by the declaration party;

(6-2) obtaining, by the base station, the flight declaration information from the first signaling; and (6-3) sending, by the base station, the flight declaration information to the core network device through a first interface, and forwarding, by the core network device, the flight declaration information to the UTM device, the first interface being configured to characterize an interface between the base station and the core network device.

The first signaling in the above (6-1) may include attachment request signaling or first RRC signaling, and the first RRC signaling may include UE assistance information signaling. The first interface in the above (6-3) may be an X2 interface or an NG interface.

In step 820, the review result returned by the UTM device is received, and the review result is forwarded to the declaration party, the review result including review passing or review failing, so that the declaration party determines whether to perform the first flight mission according to the review result.

In an embodiment of the present disclosure, the cellular network may send the flight review result of the UTM device to the declaration party.

In an embodiment, the cellular network includes a base station and a core network device, such as the base station and the core network device in the application scenario shown in FIG. 6. When the step 820 is performed, the specific implementation process thereof may include:

(7-1) receiving, by the base station, the review result sent by the core network device through a second interface, the review result being sent by the UTM device to the core network device, and the second interface being configured to characterize an interface between the base station and the core network device;

(7-2) determining, by the base station, second signaling for carrying the review result;

(7-3) adding, by the base station, the review result to the second signaling; and (7-4) sending, by the base station, the second signaling to the declaration party, so that the declaration party obtains the review result from the second signaling.

The second interface in the above (6-3) may be an X2 interface or an NG interface; and the second signaling in the above (7-2) may include but is not limited to at least one of (8-1) second RRC signaling; (8-2) MAC CE; and (8-3) physical layer signaling such as PDCCH.

It can be seen from the above embodiment that it can help the declaration part to complete the flight declaration and expand the implementation manner of the flight declaration by receiving the flight declaration information sent by the declaration party, and forwarding the flight declaration information to the UTM device, the flight declaration information including the first flight mission that needs to be declared, so that the UTM device reviews the first flight mission to obtain the review result; and receiving the review result returned by the UTM device, and forwarding the review result to the declaration party, the review result including review passing or review failing, so that the declaration party determines whether to perform the first flight mission according to the review result. Further, the security of flight declaration may be improved by performing declaration through the cellular network.

Figure 9:
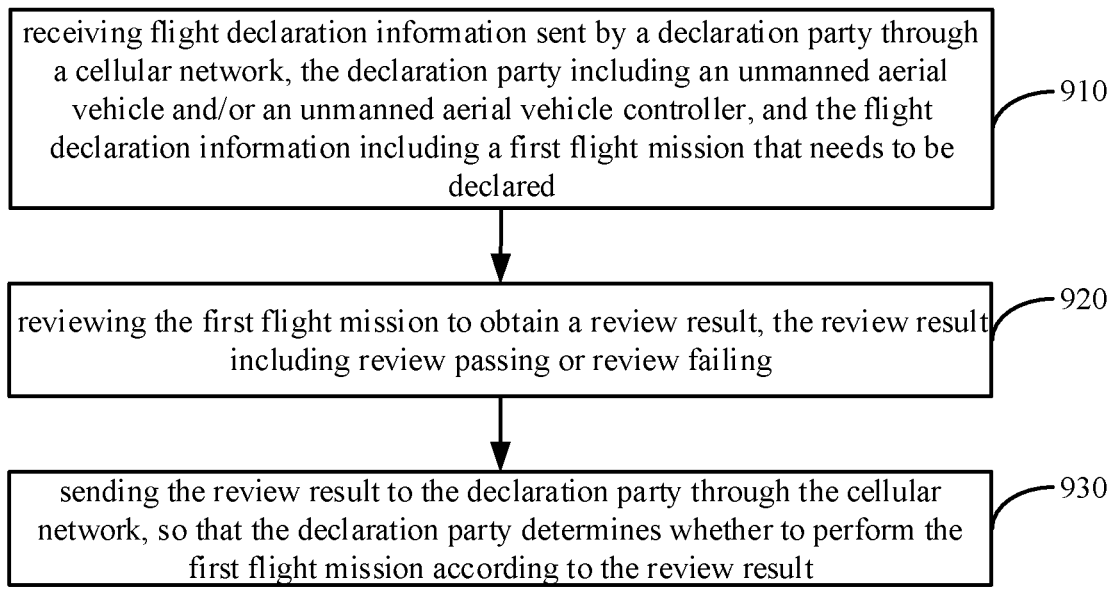
FIG. 9 is a flow chart of a flight declaration method according to an exemplary embodiment.

FIG. 9 is a flow chart of a flight declaration method according to an exemplary embodiment. The flight declaration method may be applied to the UTM device in the application scenario shown in FIG. 2. As shown in FIG. 9, the flight declaration method may include the following steps 910-930.

In step 910, flight declaration information sent by a declaration party through a cellular network is received, the declaration party including an unmanned aerial vehicle and/or an unmanned aerial vehicle controller, and the flight declaration information including a first flight mission that needs to be declared;

In step 920, the first flight mission is reviewed to obtain a review result, the review result including review passing or review failing; and In step 930, the review result is sent to the declaration party through the cellular network, so that the declaration party determines whether to perform the first flight mission according to the review result.

In an embodiment, the cellular network includes a base station and a core network device. When the step 930 is performed, the specific implementation process thereof may include:

(9-1) sending the review result to the core network device, so that the core network device forwards the review result to the base station, and then the base station forwards the review result to the declaration party.

It can be seen from the above embodiment that after the flight declaration information sent by the declaration party through the cellular network is received, the first flight mission may be reviewed to obtain the review result, the review result including review passing or review failing; and the review result is sent to the declaration party through the cellular network, so that the declaration party may determine whether to perform the first flight mission according to the review result, thereby realizing the flight declaration through the cellular network, and improving flight declaration efficiency.

Corresponding to the foregoing embodiment of the flight declaration method, the present disclosure further provides an embodiment of a flight declaration device. In addition, the parts of the embodiment of the flight declaration device that are not described in detail may refer to the corresponding embodiment of the flight declaration method.

Figure 10:
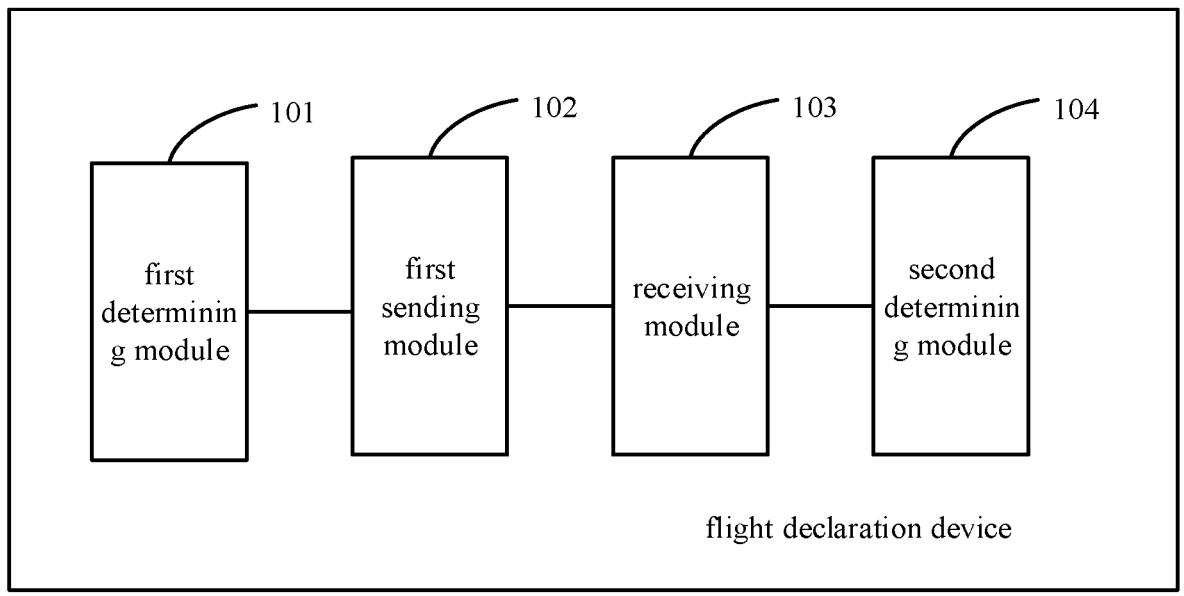
FIG. 10 is a block diagram of a flight declaration device according to an exemplary embodiment.

FIG. 10 is a block diagram of a flight declaration device according to an exemplary embodiment. The device may be applied to a declaration party, and the declaration party may include an unmanned aerial vehicle and/or an unmanned aerial vehicle controller, and is configured to perform the flight declaration method shown in FIG. 1. As shown in FIG. 10, the flight declaration device may include:

a first determining module 101, configured to determine flight declaration information, the flight declaration information including a first flight mission that needs to be declared;

a first sending module 102, configured to send the flight declaration information to a UTM device through a cellular network, so that the UTM device reviews the first flight mission to obtain a review result;

a receiving module 103, configured to receive the review result returned by the UTM device through the cellular network, the review result including review passing or review failing; and a second determining module 104, configured to determine whether to perform the first flight mission according to the review result.

It can be seen from the above embodiment that it can realizes the flight declaration through the cellular network, and expand the implementation manner of flight declaration by determining the flight declaration information; sending the flight declaration information to the UTM device through the cellular network, so that the UTM device reviews the first flight mission to obtain the review result; receiving the review result returned by the UTM device through the cellular network, the review result including the review passing or review failing; and determining whether to perform the first flight mission according to the review result.

Figure 11:
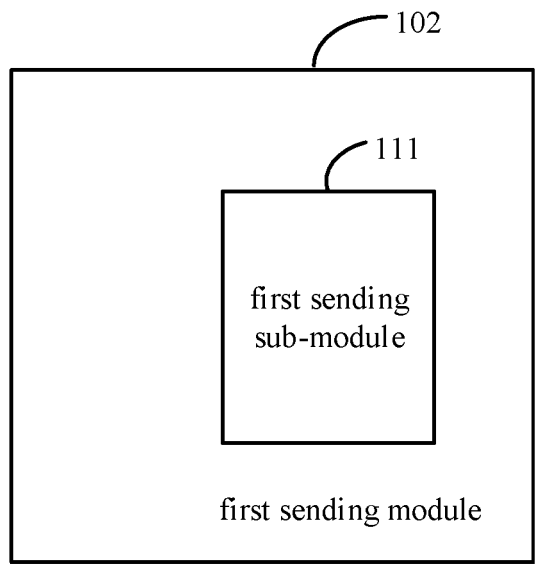
FIG. 11 is a block diagram of another flight declaration device according to an exemplary embodiment.

In an embodiment, on the basis of the device shown in FIG. 10, as shown in FIG. 11, the cellular network includes a base station and a core network device, and the first sending module 102 may include:

a first sending sub-module 111, configured to send the flight declaration information to the base station, so that the base station forwards the flight declaration information to the core network device, and then the core network device forwards the flight declaration information to the UTM device.

Figure 12:
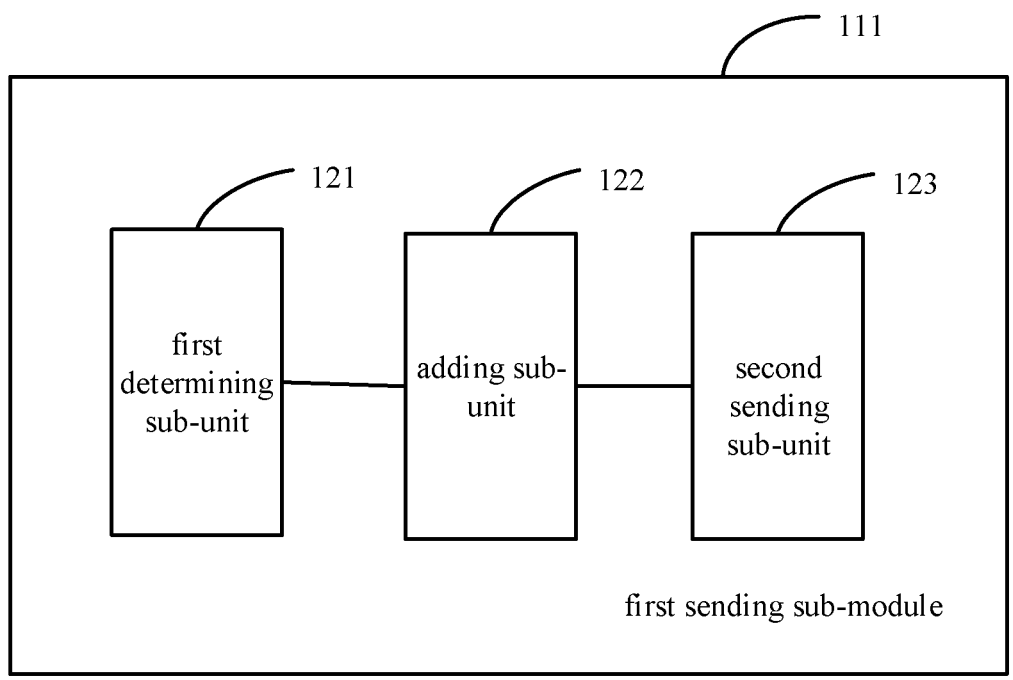
FIG. 12 is a block diagram of another flight declaration device according to an exemplary embodiment.

In an embodiment, on the basis of the device shown in FIG. 11, as shown in FIG. 12, the first sending sub-module 111 may include:

a first determining sub-unit 121, configured to determine first signaling for carrying the flight declaration information;

an adding sub-unit 122, configured to add the flight declaration information to the first signaling; and a second sending sub-unit 123, configured to send the first signaling to the base station, so that the base station obtains the flight declaration information from the first signaling.

Figure 13:
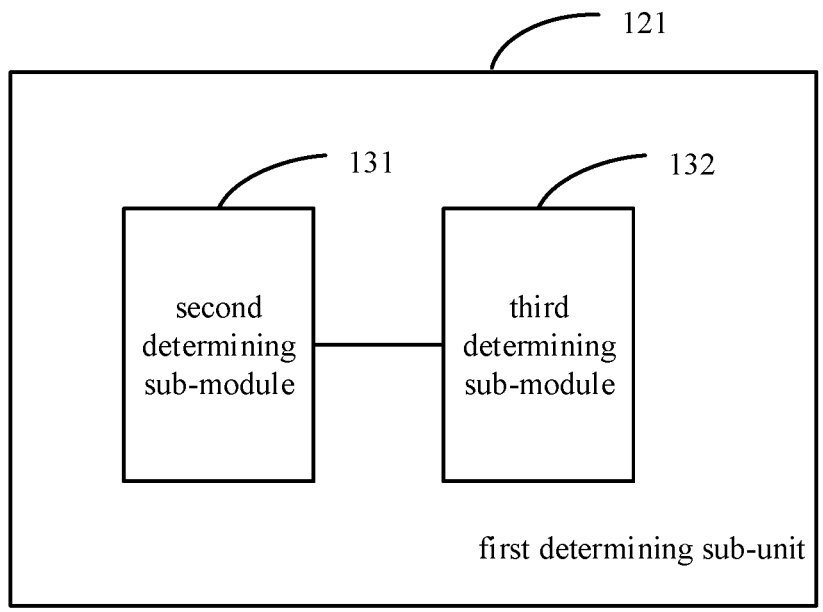
FIG. 13 is a block diagram of another flight declaration device according to an exemplary embodiment.

In an embodiment, on the basis of the device shown in FIG. 12, as shown in FIG. 13, the first determining sub-unit 121 may include:

a second determining sub-module 131, configured to, if the declaration party is performing network attachment, determine attachment request signaling as the first signaling; and a third determining sub-module 132, configured to, if the declaration party has completed the network attachment, determine first radio resource control (RRC) signaling as the first signaling, the first RRC signaling including UE assistance information signaling.

It can be seen from the above embodiment that when the cellular network includes the base station and the core network device, the flight declaration information may be sent to the base station first, and the base station forwards the flight declaration information to the core network device, and then the core network device transmits the flight declaration information to the UTM device. Especially, when the flight declaration information is sent to the base station, the flight declaration information may be sent through the first signaling that can carry the flight declaration information in different application scenarios, thereby improving the reliability of the flight declaration.

Figure 14:
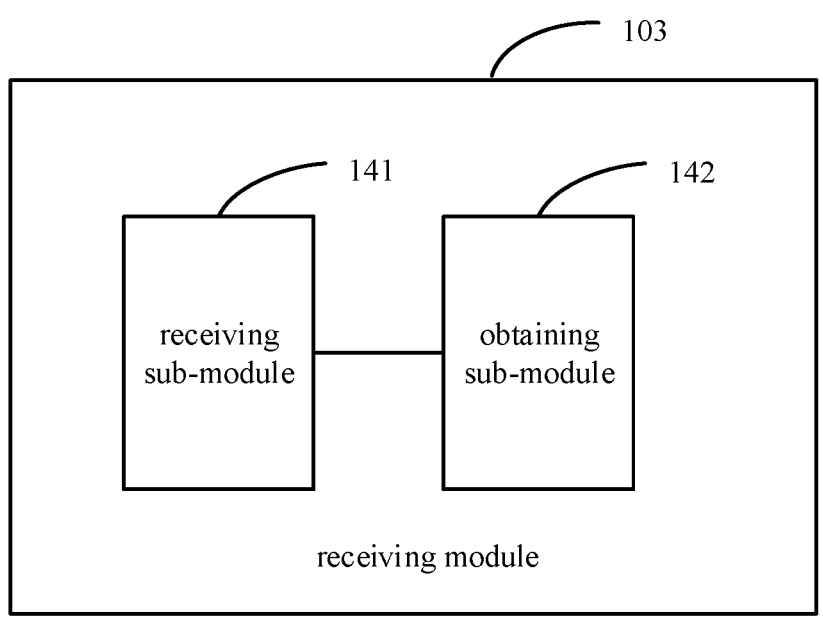
FIG. 14 is a block diagram of another flight declaration device according to an exemplary embodiment.

In an embodiment, on the basis of the device shown in FIG. 10, as shown in FIG. 14, the cellular network includes a base station and a core network device, and the receiving module 103 may include:

a receiving sub-module 141 configured to receive second signaling for carrying the review result sent by the base station, the review result being sent by the UTM device to the core network device, and then forwarded by the core network device to the base station; and an obtaining sub-module 142, configured to obtain the review result from the second signaling.

In an embodiment, on the basis of the device shown in FIG. 14, the second signaling may include but is not limited to at least one of:

second RRC signaling;

MAC CE; and physical layer signaling.

It can be seen from the above embodiment that when the cellular network includes the base station and the core network device, the review result may be obtained from the second signaling sent by the base station for carrying the review result, and especially, the second signaling may have multiple types of alternative implementation forms, thereby enriching the transmitting method of the review result, and improving the flexibility of flight declaration.

Figure 15:
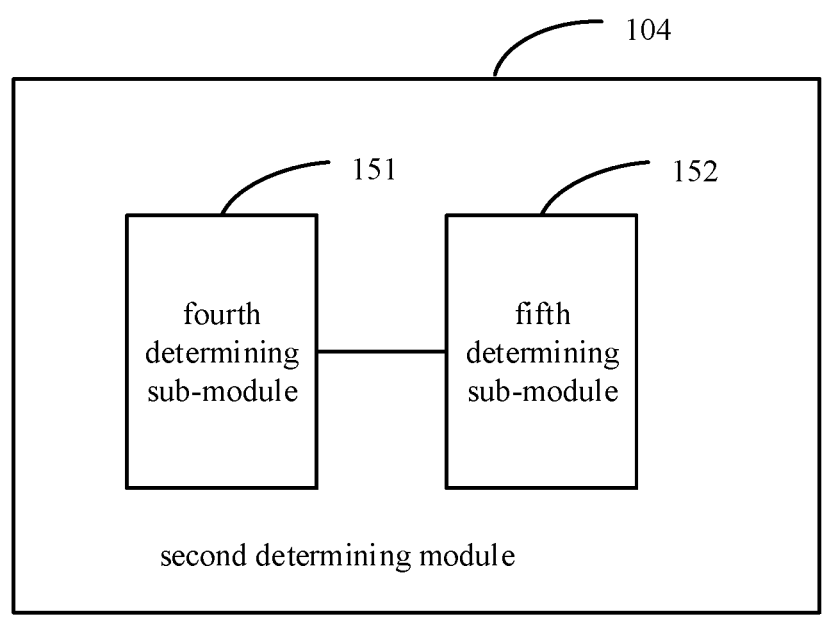
FIG. 15 is a block diagram of another flight declaration device according to an exemplary embodiment.

In an embodiment, on the basis of the device shown in FIG. 10, as shown in FIG. 15, the second determining module 104 may include:

a fourth determining sub-module 151, configured to, if the review result is the review passing, determine to perform the first flight mission; and a fifth determining sub-module 152, configured to, if the review result is the review failing, determine not to perform the first flight mission.

Figure 16:
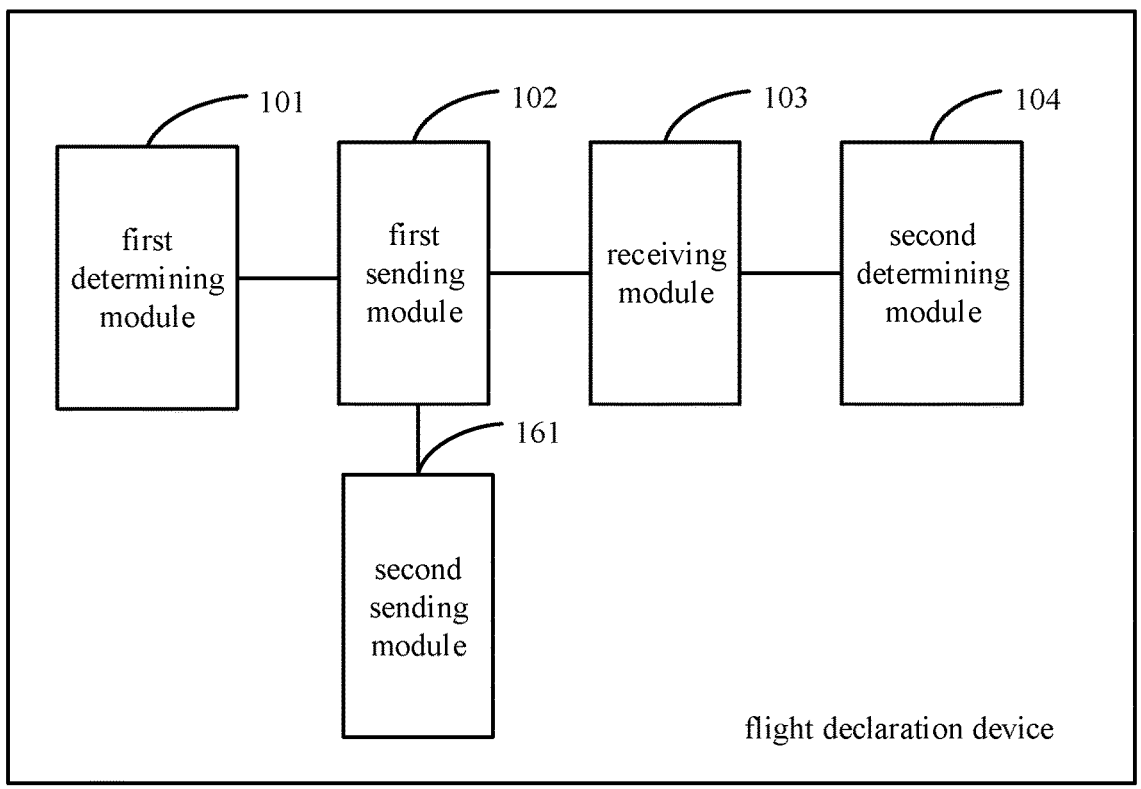
FIG. 16 is a block diagram of another flight declaration device according to an exemplary embodiment.

In an embodiment, on the basis of the device shown in FIG. 10, as shown in FIG. 16, the device may further include:

a second sending module 161, configured to, when the review result returned by the UTM device is not received within a specified time duration, re-send the flight declaration information to the base station, and abandon declaration when a number of re-declarations exceeds a predetermined threshold.

It can be seen from the above embodiment that when the review result returned by the UTM device is not received within the specified time duration, the flight declaration information may also be re-sent to the base station, and the declaration is abandoned when the number of re-declarations exceeds the predetermined threshold, thereby expanding the implementation of flight declaration, and avoiding the waste of resources.

Figure 17:
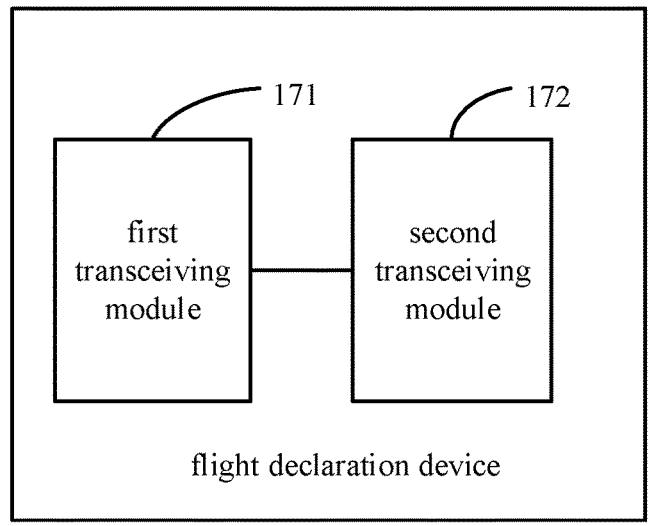
FIG. 17 is a block diagram of a flight declaration device according to an exemplary embodiment.

FIG. 17 is a block diagram of a flight declaration device according to an exemplary embodiment. The device may be applied to a cellular network that provides service to a declaration party, and the declaration party includes an unmanned aerial vehicle and/or an unmanned aerial vehicle controller, and is configured to execute the flight declaration method shown in FIG. 8. As shown in FIG. 17, the flight declaration device may include:

- a first transceiving module 171, configured to receive flight declaration information sent by the declaration party, and forward the flight declaration information to an unmanned aerial vehicle traffic management (UTM) device, the flight declaration information including a first flight mission that needs to be declared, so that the UTM device reviews the first flight mission to obtain a review result; and
- a second transceiving module 172, configured to receive the review result returned by the UTM device, and forward the review result to the declaration party, the review result including review passing or review failing, so that the declaration party determines whether to perform the first flight mission according to the review result.

It can be seen from the above embodiment that it can help the declaration part to complete the flight declaration and expand the implementation manner of the flight declaration by receiving the flight declaration information sent by the declaration party, and forwarding the flight declaration information to the UTM device, the flight declaration information including the first flight mission that needs to be declared, so that the UTM device reviews the first flight mission to obtain the review result; and receiving the review result returned by the UTM device, and forwarding the review result to the declaration party, the review result including review passing or review failing, so that the declaration party determines whether to perform the first flight mission according to the review result.

Figure 18:
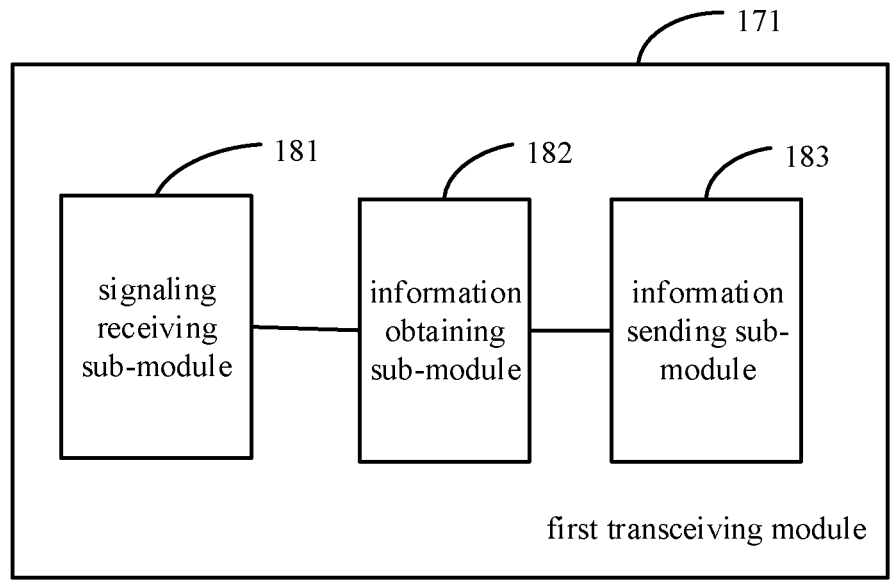
FIG. 18 is a block diagram of another flight declaration device according to an exemplary embodiment.

In an embodiment, on the basis of the device shown in FIG. 17, as shown in FIG. 18, the cellular network includes a base station and a core network device, and the first transceiving module 171 may include:

- a signaling receiving sub-module 181, configured to receive, by the base station, first signaling for carrying the flight declaration information sent by the declaration party;
- an information obtaining sub-module 182, configured to obtain, by the base station, the flight declaration information from the first signaling; and
- an information sending sub-module 183, configured to send, by the base station, the flight declaration information to the core network device through a first interface, and forwarding, by the core network device, the flight declaration information to the UTM device, the first interface being configured to characterize an interface between the base station and the core network device.

In an embodiment, on the basis of the device shown in FIG. 18, the first signaling includes attachment request signaling or first RRC signaling, and the first RRC signaling includes UE assistance information signaling.

Figure 19:
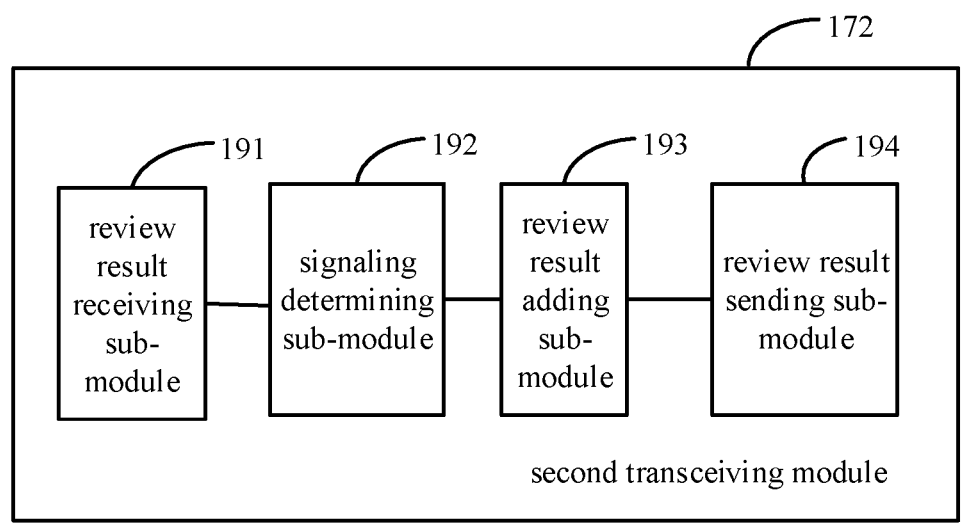
FIG. 19 is a block diagram of another flight declaration device according to an exemplary embodiment.

In an embodiment, on the basis of the device shown in FIG. 17, as shown in FIG. 19, the cellular network includes a base station and a core network device, and the second transceiving module 172 may include:

- a review result receiving sub-module 191, configured to receive, by the base station, the review result sent by the core network device through a second interface, the review result being sent by the UTM device to the core network device, and the second interface being configured to characterize an interface between the base station and the core network device;
- a signaling determining sub-module 192, configured to determine, by the base station, second signaling for carrying the review result;
- a review result adding sub-module 193, configured to add, by the base station, the review result to the second signaling; and
- a review result sending sub-module 194, configured to send, by the base station, the second signaling to the declaration party, so that the declaration party obtains the review result from the second signaling.

In an embodiment, on the basis of the device shown in FIG. 19, the second signaling may include but is not limited to at least one of:

second RRC signaling;
media access control address control element (MAC CE); and
physical layer signaling.

It can be seen from the above embodiment that after the flight declaration information sent by the declaration party through the cellular network is received, the first flight mission may be reviewed to obtain the review result, the review result including review passing or review failing; and the review result is sent to the declaration party through the cellular network, so that the declaration party may determine whether to perform the first flight mission according to the review result, thereby realizing the flight declaration through the cellular network, and improving flight declaration efficiency.

Figure 20:
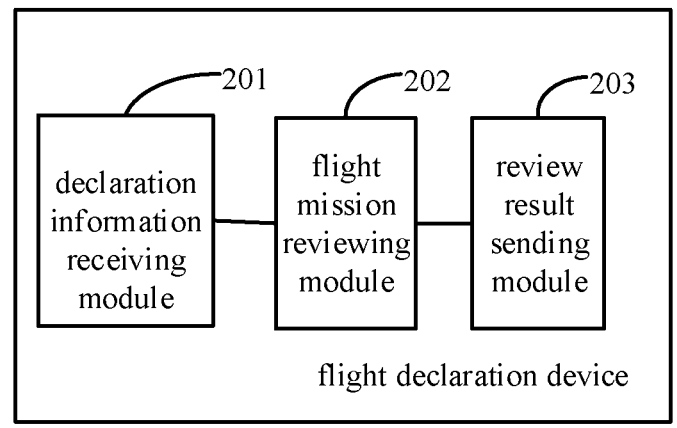
FIG. 20 is a block diagram of another flight declaration device according to an exemplary embodiment.

FIG. 20 is a block diagram of a flight declaration device according to an exemplary embodiment. The device may be applied to a UTM device and is configured to execute the flight declaration method shown in FIG. 9. As shown in FIG. 20, the flight declaration device may include:

- a declaration information receiving module 201, configured to receive flight declaration information sent by a declaration party through a cellular network, the declaration party including an unmanned aerial vehicle and/or an unmanned aerial vehicle controller, and the flight declaration information including a first flight mission that needs to be declared;
- a flight mission reviewing module 202, configured to review the first flight mission to obtain a review result, the review result including review passing or review failing; and
- a review result sending module 203, configured to send the review result to the declaration party through the cellular network, so that the declaration party determines whether to perform the first flight mission according to the review result.

Figure 21:
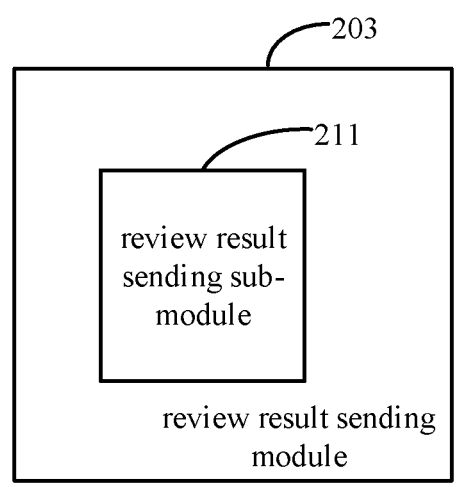
FIG. 21 is a block diagram of another flight declaration device according to an exemplary embodiment.

In an embodiment, on the basis of the device shown in FIG. 20, as shown in FIG. 21, the cellular network includes a base station and a core network device, and the review result sending module 203 may include:

- a review result sending sub-module 211, configured to send the review result to the core network device, so that the core network device forwards the review result to the base station, and then the base station forwards the review result to the declaration party.

Since the device embodiment basically corresponds to the method embodiment, corresponding description thereof may refer to the description of the method embodiment. The device embodiment described above is merely illustrative. The units described above as separate components may be or may not be physically separated, and the components displayed as units may be or may not be physical units, that is, they may be located in one place, or may be distributed on a plurality of network units. Some or all of the modules may be selected according to actual needs to achieve the objective of the solution of the present disclosure. Those skilled in the art may understand and implement the present disclosure without creative work.

Correspondingly, the present disclosure further provides a non-transitory computer-readable storage medium having a computer program stored thereon, and the computer program is configured to execute the flight declaration method described in any one of FIGS. 1 to 7 above.

Correspondingly, the present disclosure further provides a non-transitory computer-readable storage medium having a computer program stored thereon, and the computer program is configured to execute the flight declaration method described in FIG. 8 above.

Correspondingly, the present disclosure further provides a non-transitory computer-readable storage medium having a computer program stored thereon, and the computer program is configured to execute the flight declaration method described in FIG. 9 above.

Correspondingly, the present disclosure further provides a flight declaration device, which is applied to a declaration party. The declaration party includes a unmanned aerial vehicle and/or a unmanned aerial vehicle controller, and the device includes:

a processor; and a memory, storing instructions being executable by the processor
wherein the processor is configured to:
determine flight declaration information, the flight declaration information including a first flight mission that needs to be declared;
send the flight declaration information to an unmanned aerial vehicle traffic management (UTM) device through a cellular network, so that the UTM device reviews the first flight mission to obtain a review result;
receive the review result returned by the UTM device through the cellular network, the review result including review passing or review failing; and
determine whether to perform the first flight mission according to the review result.

Figure 22:
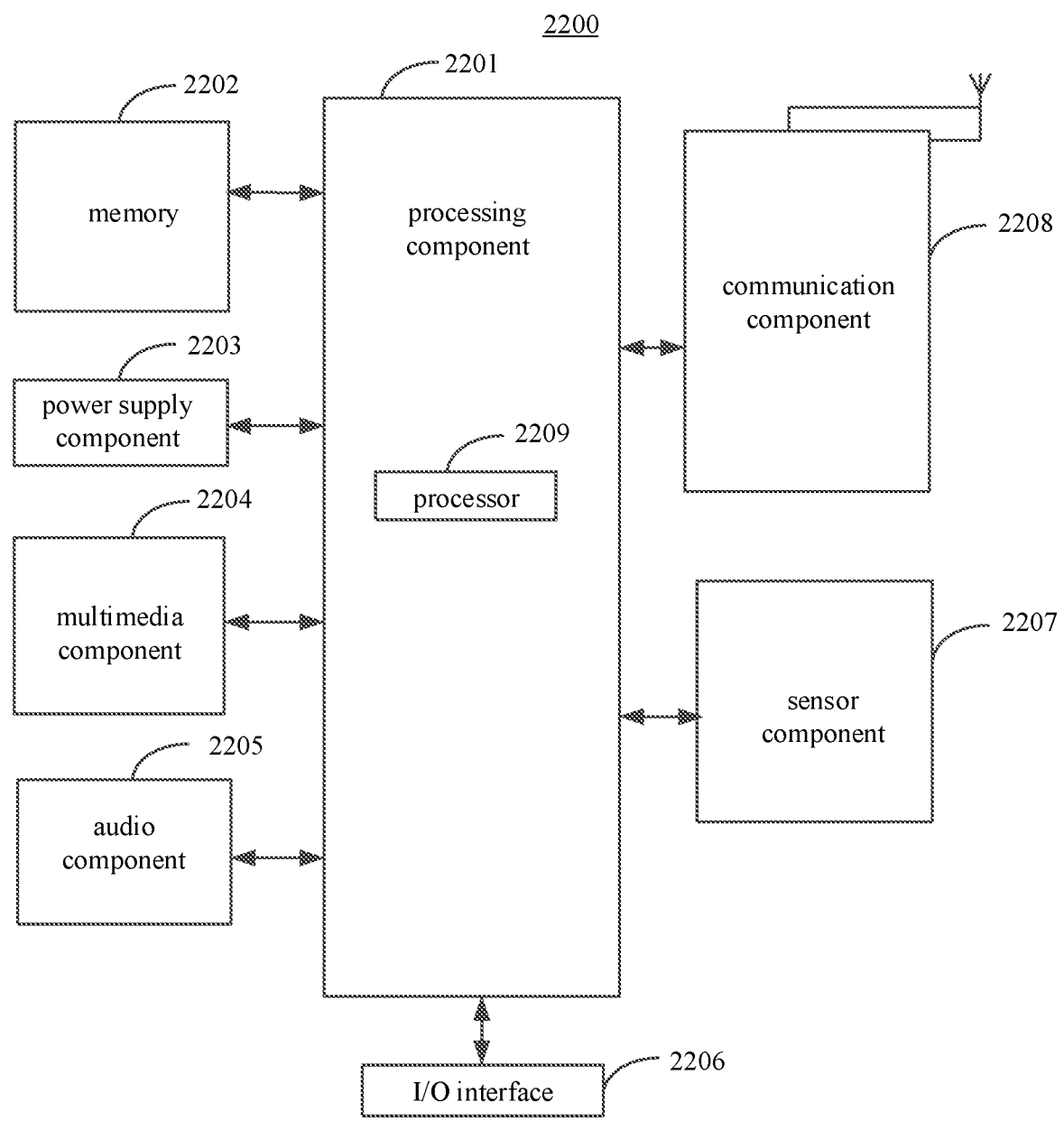
FIG. 22 is a schematic structural diagram of a flight declaration device according to an exemplary embodiment.

FIG. 22 is a schematic structural diagram of a flight declaration device according to an exemplary embodiment. The device 1800 may be provided as an unmanned aerial vehicle controller in a declaration party. Referring to FIG. 22, the device 2200 may include one or more of: a processing component 2201, a memory 2202, a power supply component 2203, a multimedia component 2204, an audio component 2205, an input/output (I/O) interface 2206, a sensor component 2207, and a communication component 2208.

The processing component 2201 generally controls the overall operation of the device 2200, such as operations associated with display, telephone call, data communication, camera operation, and recording operation. The processing component 2201 may include one or more processors 2209 to execute instructions to complete all or part of the steps of the foregoing method. In addition, the processing component 2201 may include one or more modules to facilitate interaction between the processing component 2201 and other components. For example, the processing component 2201 may include a multimedia module to facilitate the interaction between the multimedia component 2204 and the processing component 2201.

The memory 2202 is configured to store various types of data to support the operation of the device 2200. Examples of these data include instructions for any application or method operating on the device 2200, contact data, phone book data, message, picture, video and the like. The memory 2202 may be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 2203 provides power to various components of the device 2200. The power supply component 2203 may include a power management system, one or more power supplies, and other components associated with generating, managing, and distributing power for the device 2200.

The multimedia component 2204 includes a screen that provides an output interface between the device 2200 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or sliding operation, but also detect the duration and pressure related to the touch or sliding operation. In some embodiments, the multimedia component 2204 includes a front camera and/or a rear camera. When the device 2200 is in an operation mode, such as a shooting mode or a video mode, the front camera and/or the rear camera may receive external multimedia data. Each front camera and rear camera may be a fixed optical lens system or have focal length and optical zoom capabilities.

The audio component 2205 is configured to output and/or input audio signals. For example, the audio component 2205 includes a microphone (MIC). When the device 2200 is in an operation mode, such as a call mode, a recording mode, and a voice recognition mode, the microphone is configured to receive external audio signals. The received audio signal may be further stored in the memory 2202 or transmitted via the communication component 2208. In some embodiments, the audio component 2205 further includes a speaker for outputting audio signals.

The I/O interface 2206 provides an interface between the processing component 2201 and a peripheral interface module. The peripheral interface module may be a keyboard, a click wheel, a button, and the like. These buttons may include but are not limited to a home button, a volume button, a start button, and a lock button.

The sensor component 2207 includes one or more sensors for providing the device 2200 with various aspects of status evaluation. For example, the sensor component 2207 may detect an on/off status of the device 2200 and relative positioning of components (for example, the relative positioning between the display and keypad of the device 2200). The sensor component 2207 may further detect a position change of the device 2200 or a component of the device 2200, presence or absence of contact between the user and the device 2200, orientation or acceleration/deceleration of the device 2200, and a temperature change of the device 2200. The sensor component 2207 may include a proximity sensor configured to detect presence of a nearby object when there is no physical contact. The sensor component 2207 may further include a light sensor, such as a CMOS or CCD image sensor, for use in imaging applications. In some embodiments, the sensor component 2207 may further include an acceleration sensor, a gyroscope sensor, a magnetic sensor, a pressure sensor or a temperature sensor.

The communication component 2208 is configured to facilitate wired or wireless communication between the device 2200 and other devices. The device 2200 may access a wireless network based on a communication standard, such as WiFi, 2G, or 3G, or a combination thereof. In an exemplary embodiment, the communication component 2208 receives a broadcast signal or broadcast related information from an external broadcast management system via a broadcast channel. In an exemplary embodiment, the communication component 2208 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the device 2200 may be implemented by one or more of application specific integrated circuit (ASIC), digital signal processor (DSP), digital signal processing device (DSPD), programmable logic device (PLD), field programmable gate array (FPGA), controller, microcontroller, microprocessor or other electronic components to implement the above method.

In an exemplary embodiment, there is further provided a non-transitory computer-readable storage medium including instructions, such as the memory 2202 including instructions, and the foregoing instructions may be executed by the processor 2209 of the device 2200 to complete the foregoing method. For example, the non-transitory computer-readable storage medium may be ROM, random access memory (RAM), CD-ROM, magnetic tape, floppy disk, optical data storage device and the like.

When the instructions in the storage medium are executed by the processor, the device 2200 can execute any of the flight declaration methods described above.

Correspondingly, the present disclosure further provides a flight declaration device. The device is applied to a cellular network that provides service to a declaration party including an unmanned aerial vehicle and/or an unmanned aerial vehicle controller, and the device includes:
 a processor; and a memory, storing instructions being executable by the processor,
 wherein the processor is configured to:
 receive flight declaration information sent by the declaration party, and forward the flight declaration information to an unmanned aerial vehicle traffic management (UTM) device, the flight declaration information including a first flight mission that needs to be declared, so that the UTM device reviews the first flight mission to obtain a review result; and
 receive the review result returned by the UTM device, and forward the review result to the declaration party, the review result including review passing or review failing, so that the declaration party determines whether to perform the first flight mission according to the review result.

Figure 23:
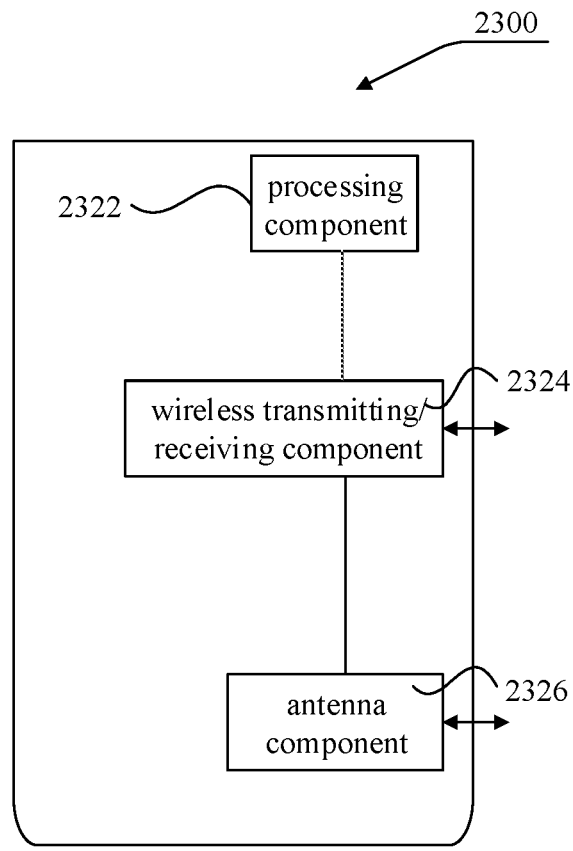
FIG. 23 is a schematic structural diagram of a flight declaration device according to an exemplary embodiment.

As shown in FIG. 23, FIG. 23 is a schematic structural diagram of a flight declaration device according to an exemplary embodiment. The device 2300 may be provided as a base station in a cellular network. Referring to FIG. 23, the device 2300 includes a processing component 2322, a wireless transmitting/receiving component 2324, an antenna component 2326, and a signal processing part specific to a wireless interface. The processing component 2322 may further include one or more processors.

One of the processors in the processing component 23222 may be configured to execute any of the flight declaration methods described above.

Correspondingly, the present disclosure further provides a flight declaration device. The device is applied to a UTM device, and the device includes:
 a processor; and a memory, storing instructions being executable by the processor,
 wherein the processor is configured to:
 receive flight declaration information sent by a declaration party through a cellular network, the declaration party including an unmanned aerial vehicle and/or an unmanned aerial vehicle controller, and the flight declaration information including a first flight mission that needs to be declared;
 review the first flight mission to obtain a review result, the review result including review passing or review failing; and
 send the review result to the declaration party through the cellular network, so that the declaration party determines whether to perform the first flight mission according to the review result.

After considering the specification and practicing the disclosure disclosed herein, those skilled in the art will easily conceive of other embodiments of the present disclosure. The present application is intended to cover any variations, uses, or adaptive changes of the present disclosure. These variations, uses, or adaptive changes follow the general principle of the present disclosure and include the common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

What is claimed is:

1. A flight declaration method, comprising:
 a declaration party determining flight declaration information, the declaration party comprising at least one of an unmanned aerial vehicle and an unmanned aerial vehicle controller, and the flight declaration information comprising a first flight mission to be declared;
 the declaration party determining first signaling for carrying the flight declaration information, adding the flight declaration information to the first signaling, and sending the first signaling to a base station;
 the base station obtaining the flight declaration information from the first signaling, and sending the flight declaration information to a core network device through a first interface, the first interface being an NG interface;
 the core network device forwarding the flight declaration information to an unmanned aerial vehicle traffic management (UTM) device;
 the UTM device reviewing the first flight mission to obtain a review result and sending the review result to the core network device, the review result comprising review passing or review failing;

the core network device sending the review result to the base station;

the base station receiving the review result sent by the core network device through a second interface, determining second signaling for carrying the review result, adding the review result to the second signaling, and sending the second signaling to the declaration party, the second interface being the NG interface, the second signaling comprising at least one of media access control address control element (MAC CE) and physical layer signaling, and the at least one of the MAC CE and the physical layer signaling carrying the review result;

the declaration party receiving the second signaling sent by the base station, obtaining the review result from the second signaling, determining whether to perform the first flight mission according to the review result; and when the declaration party does not receive the review result within a specified time duration, re-sending the flight declaration information to the base station, and abandoning declaration when a number of re-declarations exceeds a predetermined threshold, wherein the declaration party determining the first signaling for carrying the flight declaration information comprises:

in response to the declaration party performing network attachment, determining attachment request signaling as the first signaling, the attachment request signaling carrying the flight declaration information; and in response to the declaration party having completed the network attachment, determining first radio resource control (RRC) signaling as the first signaling, the first RRC signaling comprising UE assistance information signaling, the UE assistance information signaling carrying the flight declaration information.

2. The method according to claim 1, wherein the declaration party determining whether to perform the first flight mission according to the review result comprises:

in response to the review result being the review passing, determining to perform the first flight mission; and in response to the review result being the review failing, determining not to perform the first flight mission.

3. A fight declaration system, comprising:

a declaration party, configured to determine flight declaration information comprising a first flight mission to be declared, determine first signaling for carrying the flight declaration information, add the flight declaration information to the first signaling, send the first signaling to a base station, receive second signaling sent by the base station, obtain, from the second signaling, a review result of an unmanned aerial vehicle traffic management (UTM) device reviewing the first flight mission, determine whether to perform the first flight mission according to the review result, and when the declaration party does not receive the review result within a specified time duration, re-send the flight declaration information to the base station, and abandon declaration when a number of re-declarations exceeds a predetermined threshold;

the base station, configured to obtain the flight declaration information from the first signaling, send the flight declaration information to a core network device through a first interface, receive the review result sent by the core network device through a second interface, determine second signaling for carrying the review result, add the review result to the second signaling, and send the second signaling to the declaration party, the first interface being an NG interface, the second interface being the NG interface, the second signaling comprising at least one of media access control address control element (MAC CE) and physical layer signaling, and the at least one of the MAC CE and the physical layer signaling carrying the review result;

the core network device, configured to forwarding the flight declaration information to the UTM device, receive the review result returned by the UTM device, and send the review result to the base station; and the UTM device, configured to review the first flight mission to obtain the review result and send the review result to the core network device, the review result comprising review passing or review failing, wherein the declaration party comprises at least one of an unmanned aerial vehicle and an unmanned aerial vehicle controller, and the declaration party, when being configured to determine the first signaling for carrying the flight declaration information, is specifically configured to:

in response to the declaration party performing network attachment, determine attachment request signaling as the first signaling, the attachment request signaling carrying the flight declaration information; and in response to the declaration party having completed the network attachment, determine first radio resource control (RRC) signaling as the first signaling, the first RRC signaling comprising UE assistance information signaling, the UE assistance information signaling carrying the flight declaration information.

4. The fight declaration system according to claim 3, wherein the declaration party, when being configured to determine whether to perform the first flight mission according to the review result, is specifically configured to:

in response to the review result being the review passing, determine to perform the first flight mission; and in response to the review result being the review failing, determine not to perform the first flight mission.

* * * * *